350-96.25

XR  3,790,791

SEARCH ROOM

[11] 3,790,791
[45] Feb. 5, 1974

SUBSTITUTE FOR MISSING XR

[54] OPTOELECTRONIC CABLE ASSEMBLY
[75] Inventor: Norman Richard Anderson, Cicero, Ill.
[73] Assignee: Bunker Ramo Corporation, Oak Brooks, Ill.
[22] Filed: July 20, 1972
[21] Appl. No.: 273,527

[52] U.S. Cl.................. 250/227, 250/238, 356/96 B
[51] Int. Cl. ............................................. G02b 5/16
[58] Field of Search ........... 250/227, 238, 239, 218; 350/96 B

[56] References Cited
UNITED STATES PATENTS

| 3,663,822 | 5/1972 | Uchida............................ 250/227 X |
| 3,353,026 | 11/1967 | Israely................................ 250/227 |
| 3,700,900 | 2/1969 | Herleikson...................... 250/227 X |
| 3,502,887 | 3/1970 | Erickson et al..................... 250/218 |
| 3,103,587 | 9/1963 | Ure, Jr. et al.................. 250/238 X |
| 3,637,284 | 1/1972 | Plyler .............................. 350/96 B |
| 3,582,637 | 6/1971 | Cecil, Jr. ........................ 350/96 XB |
| 3,432,676 | 3/1969 | Lindberg............................ 250/239 |

Primary Examiner—Walter Stolwein
Attorney, Agent, or Firm—William Lohff; Ronald J. Kransdorf

[57] ABSTRACT

This invention relates to an optoelectronic cable assembly which utilizes standard connector elements as part of the termination assemblies. Mounted in each termination assembly are a plurality of termination elements each of which is adapted to have a fiber optic light conducting cable secured therein. An active optoelectronic device is mounted in a suitable mounting means in each of the termination elements and contact means are attached at one end through the mounting means to make electrical contact with the active device. The contacts project at the other end for connection to external elements. The mounting means is supported by a suitable means in the bore of the element body. A lens or other suitable device is mounted in front of the device for transmitting light between the device and the cable. The assembly design, particularly that for the termination assembly containing a light emitting device, is specially designed for dissipating heat from the device.

15 Claims, 9 Drawing Figures

Ferrule + fiber bundle ... in contact with clear seal element 118 over lens 116

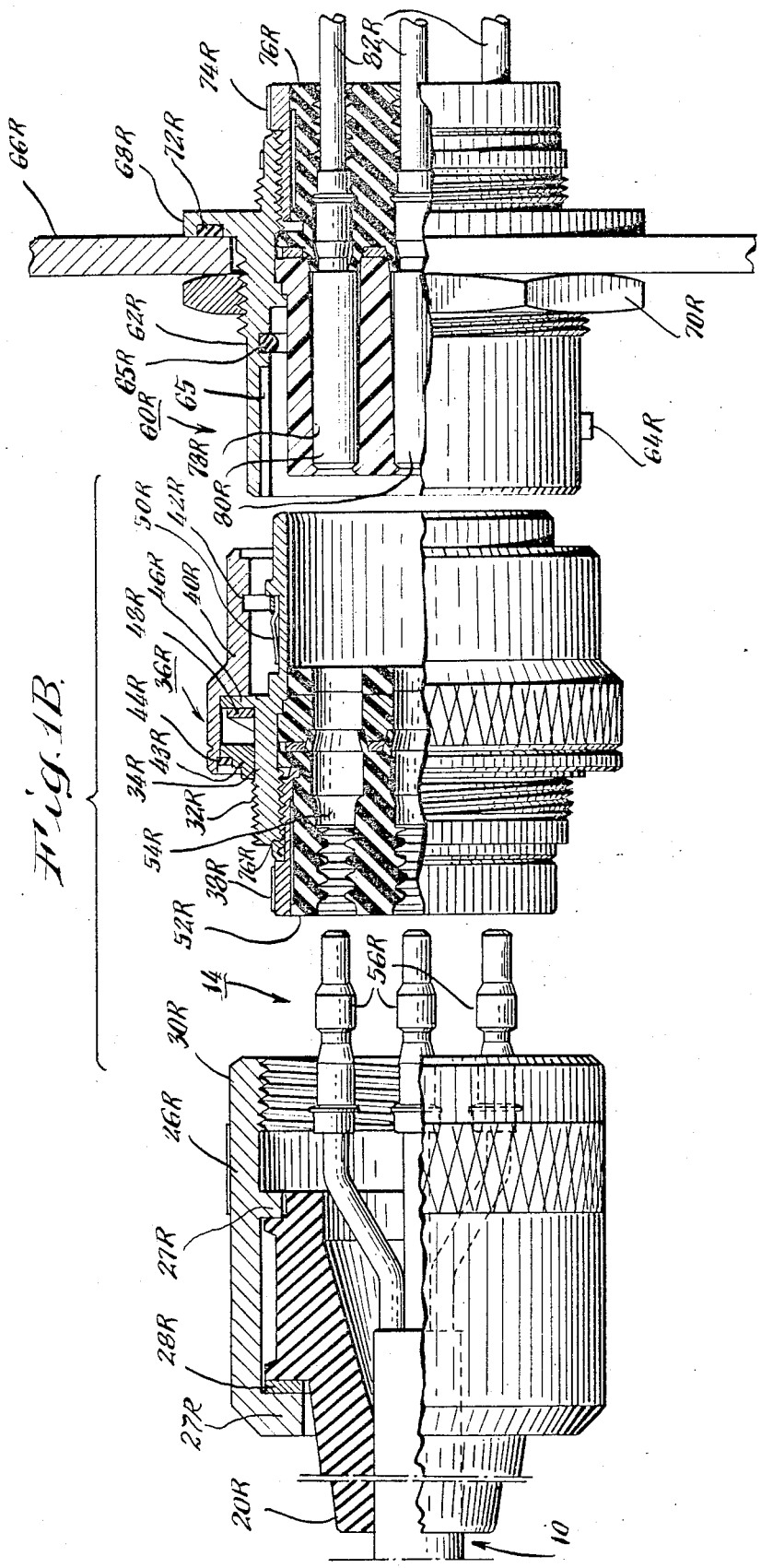

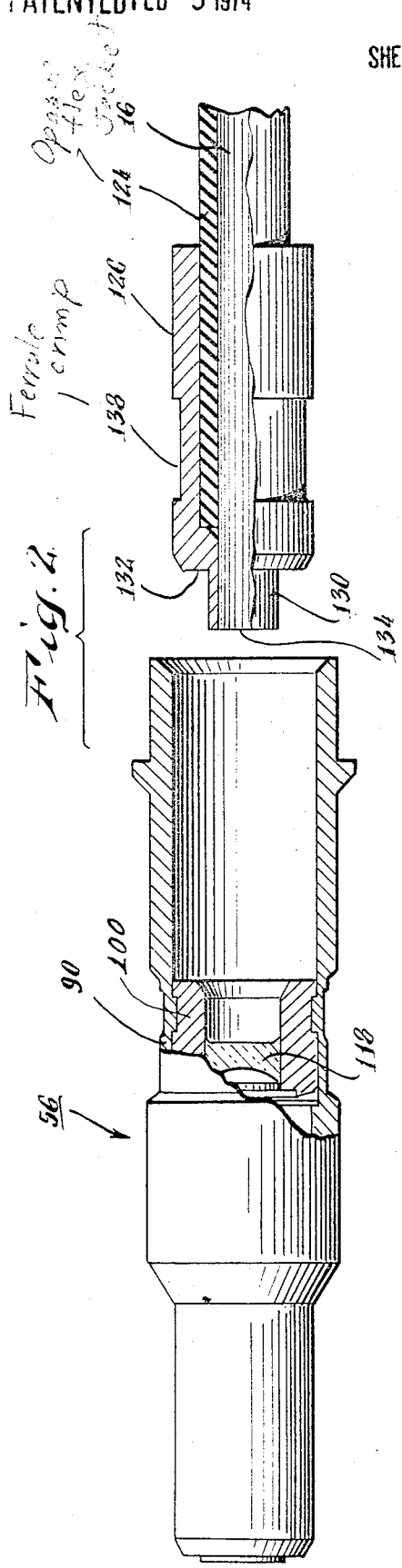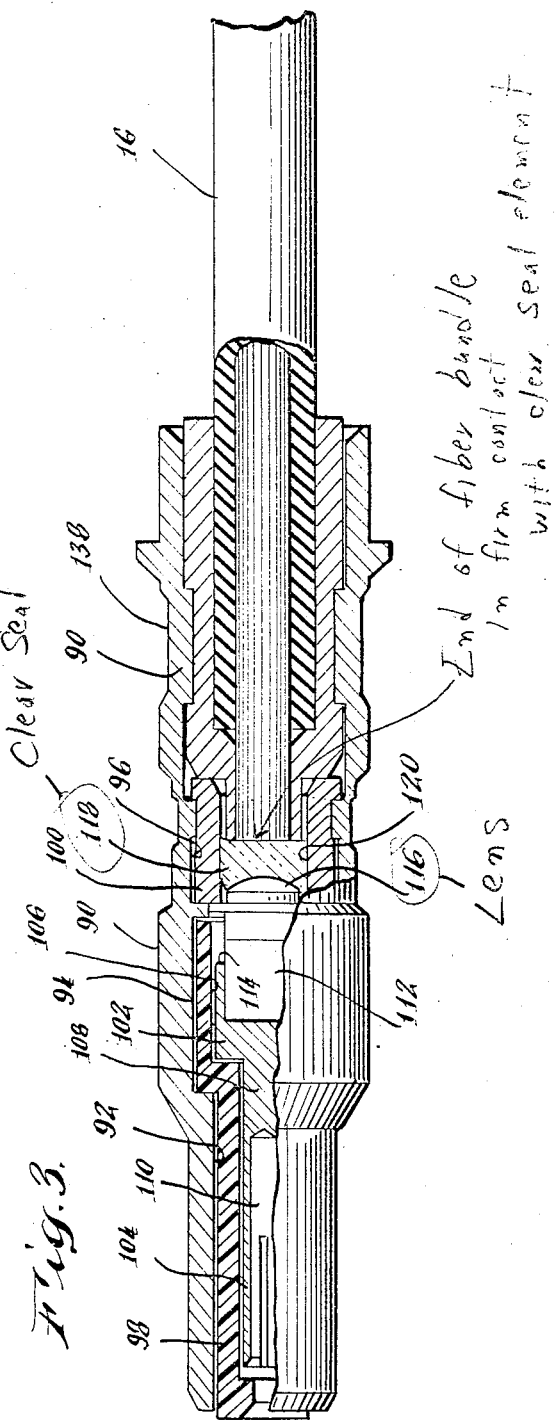

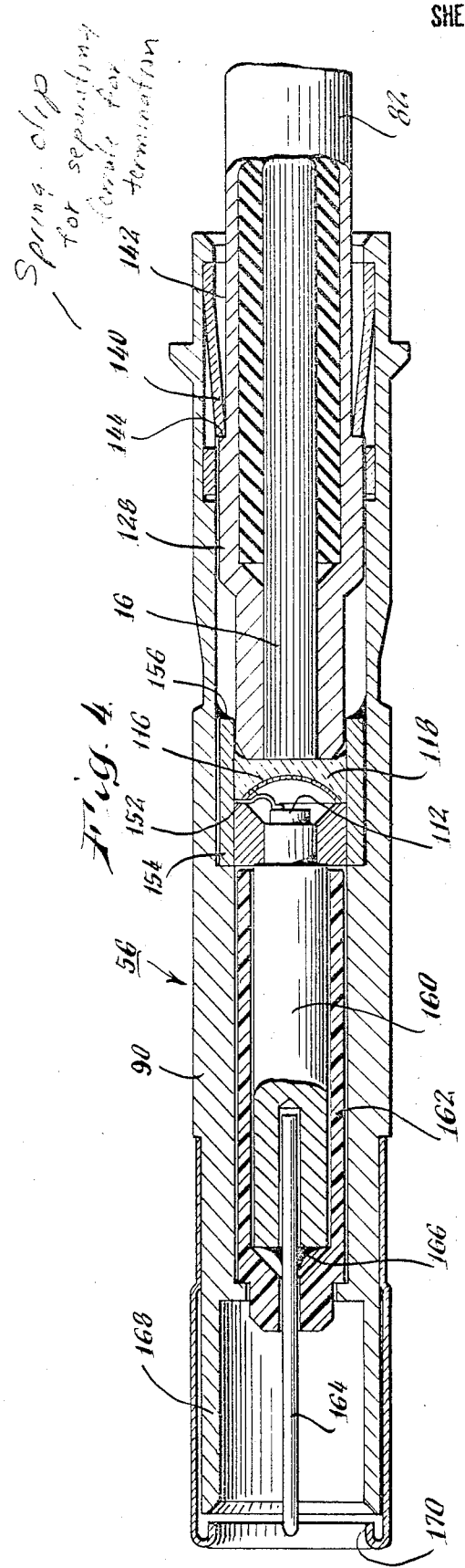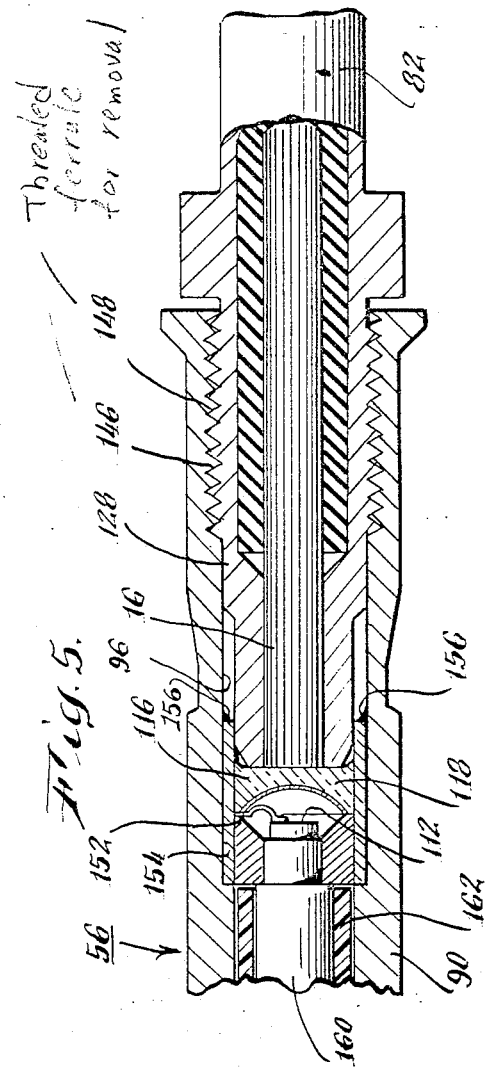

OPTOELECTRONIC CABLE ASSEMBLY

This invention relates to an optoelectronic cable assembly and more particularly to terminating elements for such an assembly which elements are adapted for applying light to a light conducting cable, detecting light in the cable, and interfacing the cable with external devices.

BACKGROUND OF THE INVENTION

One problem in transmitting information through standard electrical cables is the undesirable effect of radiated and conducted EMI (electro-magnetic interference) normally associated with these cables. Such EMI may, for example, cause spurious or other erroneous readings from equipment attached to the cable. One solution to this problem has been to convert the information to be transmitted from electrical energy to light energy, transmit the light energy signal through a light conducting cable such as, for example, a fiber optic bundle, and reconvert the light energy into electrical energy at the receiving end. Since the light conducting cable is not responsive to EMI, interference on the line is thus eliminated. Further, a device to be isolated may be positioned in an isolation chamber and a light conducting cable connected to it through a waveguide dimensioned to be below cut-off for the EMI signals.

While from the above it is apparent that there are some advantages to the use of light conducting cable for the transmission of information, the extensive use of the cables for this purpose has heretofore been restricted by the high cost and limited availability of optoelectronic cable terminations. These limitations have arisen principally from the fact that special connector elements have been required, frequently requiring special tooling for servicing. The packaging of active optoelectronic devices in standard connector elements has not, however, heretofore been possible. One reason for this is that these devices, particularly those which emit light, generate substantial heat which must be dissipated to prevent device damage. The fitting of an adequate heat dissipating mechanism within the confines of a standard connector shell or body has not heretofore been accomplished.

It is therefore apparent that the cost of optoelectronic cable assemblies and in particular of the termination elements for the light conducting cable could be significantly reduced, and the availability of these elements significantly improved, if a way could be devised for packaging standard active optoelectronic devices in the shells or bodies of standard electrical connectors. Such connector bodies should permit the easy insertion and removal of components without the requirement for special tools. In addition, the termination should be designed to accept currently available fiber optic bundles, and should provide a mechanism for dissipating heat from the active element, particularly a light emitting element.

SUMMARY OF THE INVENTION

In accordance with the above, this invention provides a termination element for light conducting cable which includes an element body having a central bore. The bore includes an enlarged forward counterbore adapted to have the light conducting cable secured therein. An active optoelectronic device is mounted in a solid metallic element which is supported in the body bore and is adapted for dissipating heat from the device. Contact means are attached at one end through the mounting means to make electrical contact with the active device. The contacts project at the other end from the element for connection to external elements. Finally, a means is mounted in front of the device for transmitting light between the device and the cable.

For the preferred embodiment of the invention there are a plurality of termination elements which are supported by a suitable means in the bore of a connector shell. There is a separate light conducting cable associated with each of the elements. In order to remove heat from the active element, heat dissipating material may also be utilized for the element supporting means.

The foregoing and other objects, features and advantages of the invention will be apparent from the following more particular description of preferred embodiments of the invention as illustrated in the accompanying drawings.

BRIEF DESCRIPTION OF DRAWINGS

FIG. 1B is a partially sectional, partially disassembled view of the receiving end of an optoelectronic cable assembly of a preferred embodiment of the invention.

FIG. 2 is a partially sectional disassembled view of an optoelectronic termination of a first embodiment of the invention.

FIG. 3 is a partial sectional view of an assembled optoelectronic termination of the embodiment of the invention shown in FIG. 2.

FIG. 4 is a sectional view of an optoelectronic termination element for a modified embodiment of the invention.

FIG. 5 is a sectional view of an optoelectronic termination element for another modified embodiment of the invention.

DETAILED DESCRIPTION

Figure 1A:
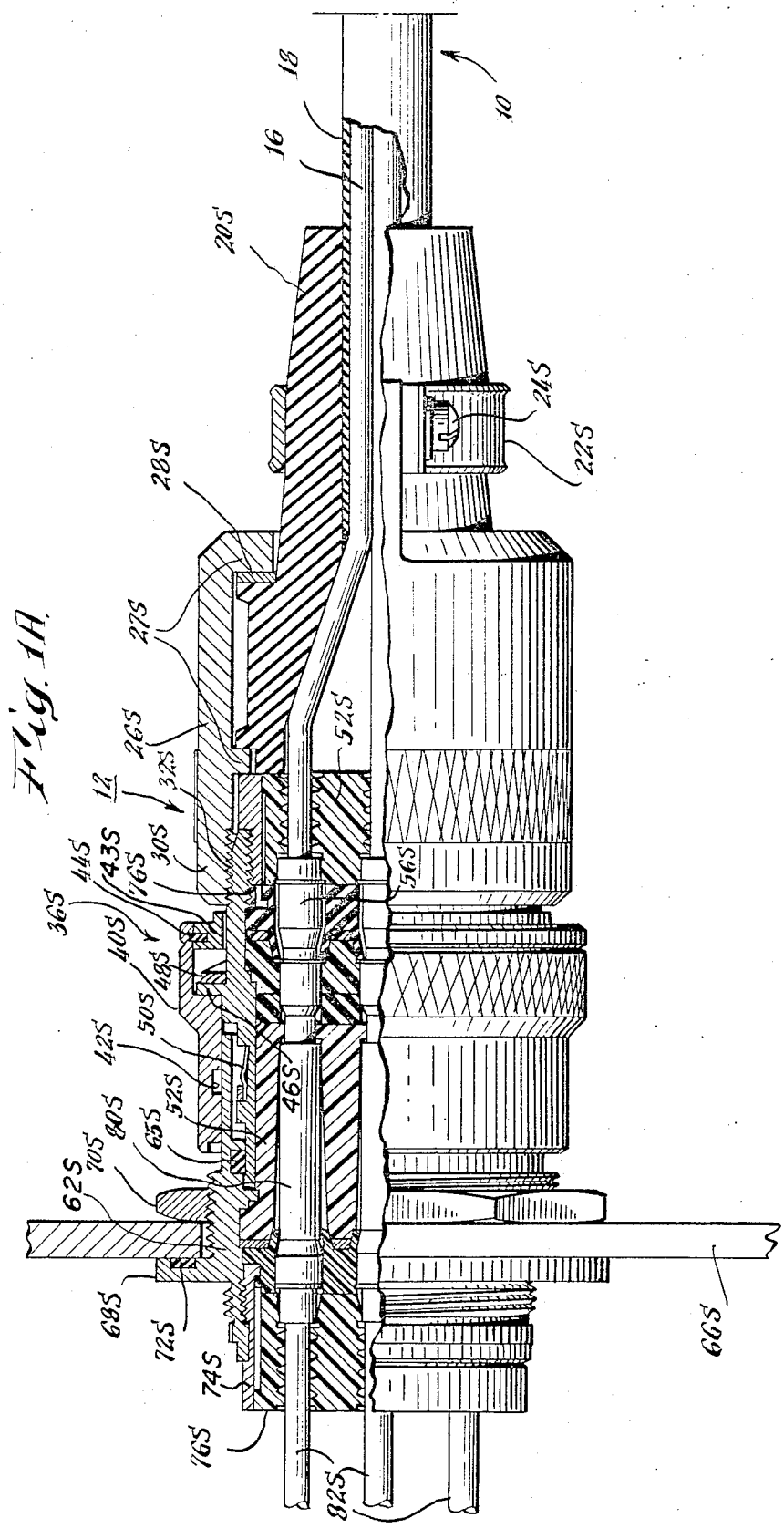
FIG. 1A is a partially sectional, assembled view of the sending end of a optoelectronic cable assembly of a preferred embodiment of the invention.

Referring now to FIGS. 1A and 1B, it is seen that the optoelectronic cable assembly consists of a light conducting cable 10 which is terminated at one end, which will for purposes of the following discussion be considered the sending end, by a connector assembly 12 (FIG. 1A), and is terminated at the other end, which will hereinafter be referred to as the receiving end, in a connector assembly 14 (FIG. 1B). Cable 10 consists of a number of fiber optic bundles 16 contained within a flexible jacket 18. The number of fiber optic bundles 16 within the cable will vary with application and is limited only by the size of connector available. Each bundle 16 consists of a large number of fibers which may either be of glass or of plastic. Plastic fiber bundles may use fine strands of Lucite or similar material. These strands are more flexible than glass and thus less prone to breakage. Plastic strands, on the other hand, have limited high temperature capability and usually exhibit greater light attenuation characteristics than glass at the light transmitting frequencies that the assembly would normally be operating at. In the discussion to follow, the bundles 16 will therefore be considered to be of glass fiber.

Jacket 18 is, for a preferred embodiment of the invention, heat-shrinkable tubing which is shrunk into place over the bundles. Since excessively sharp bends in the fiber optic bundles can cause breakage of the glass fibers with a resultant loss of light intensity at the receiving end, strain relief boot assemblies 20S and 20R were provided at the sending end and receiving end of the cable respectively to prevent the application of excessive forces to the terminations and prevent the cable from being bent sharply at its exist from the rear of the connectors.

Except as specifically indicated in the discussion to follow, the sending-end connector assembly 12 and receiving-end connector assembly 14 are substantially indentical. Therefore, in the discussion to follow, the same reference numeral will be used to designate common elements in the two assemblies. Where it is necessary to distinguish a component of one assembly from the corresponding component of the other assembly, the letters S (for sending end) and R (for receiving end) following the reference numeral will be utilized to indicate the assembly in which the component is located.

Referring still to FIGS. 1A and 1B, there is a cable clamp 22 (the portion of the connector containing clamp 22R has been omitted from FIG. 1B) mounted on each strain relief boot 20. Clamp 22 is tightened on a boot 20 to support the cable by turning screws 24. A strain relief housing 26 is mounted for rotation on boot 20 and is held on the boot by projections 27. A washer 28 prevents binding between housing 26 and boot 20 so that cable 10 is not twisted as the housing is rotated. Housing 26 has an extending internally threaded sleeve 30 which mates with an external thread on a sleeve 32 of shell or body 34 of a standard plug connector 36. Connector 36 also includes a locking nut 38 of conductive material screw threaded to the inside of sleeve 32 and a coupling ring 40 mounted for rotation on body 34. Ring 40 has a cam track 42 formed in its inner bore and has a rear counterbore of increased diameter with a slip ring 43 captivated therein by a retainer-ring 44. Ring 40 is captivated on body 34 by a flange 46 on the body which is positioned in a counterbore of the ring. A spring wave washer 48 is also provided. Body 34 also has a grounding spring finger 50 on its ferrule portion, the function of which will be described later and a number of dielectric inserts (collectively given the reference numeral 52) positioned in its bore. A plurality of contact pockets 54 are formed through the dielectric inserts. As will be described shortly, each of the pockets 54 is adapted to receive an optoelectronic termination element 56, there being an element 56S attached to the sending end of each fiber optic bundle 16 and a termination element 56R connected to the receiving end of each fiber optic bundle. The termination elements 56 will be described in greater detail later. While various conventional plug connectors of front or rear release designs might be utilized for the connector elements 36, the elements shown in FIGS. 1A and 1B and described above are the plugs for the Amphenol 348 Series connectors. For the preferred embodiment, size 12 contact pockets 54 have been utilized.

Connector plug 36 mates with a connector receptacle 60 which is shown in the figure by way of example as also being of the Amphenol 348 Series type. Receptacle 60 has a body 62 with a bayonet pin 64 on its outer surface. Bayonet pin 64 is adapted to mate with cam track 42 to connect the plug and receptacle. When the plug and receptacle are mated, the portion of spring 50 which is not adjacent a key slot 65 engages the inner wall of receptacle body 62 providing body-to-body electrical continuity. Springs 50 also improve the connector shielding characteristics and aid in heat dissipation. On mating, a sealing O-ring 64 is depressed by the leading edge of plug body 34. Receptacle 60 is mounted on a panel 66 by a flange 68 on the body and a nut 70 screw threaded on the body. A sealing O-ring 72 is provided in flange 68. A conductive ring 74 is screw threaded to the rear of body 62. A number of dielectric inserts collectively referred to by the reference numeral 76 are mounted in body 62. The inserts have contact pockets 78 formed through them in which are mounted standard size 12 shielded female receptacle-type contacts 80. Each of the contacts 80S is connected to an input cable 82S and each of the receiving end contacts 80R is connected to an output cable 82R. The cables 82S are connected to one or more sources or data pulses or other electrical impulses which may be converted into light energy (not shown), while the cables 82R are connected to one or more data receivers (not shown).

OPTOELECTRONIC TERMINATION ELEMENTS

FIGS. 2 and 3 respectively show a single optoelectronic termination element 56 before a fiber optic bundle is secured in it and with the fiber optic bundle secured in place. Termination 56 consists of an electrically conductive body 90 having an axial bore 92 with enlarged counterbores 94 and 96. A dielectric insert 98 having an axial bore is positioned in bore 92 and counterbore 94 and an electrically conductive ferrule 100 is positioned to partially fill counterbore 96. A component mounting member 102 of a conductive material is supported in a bore 104 and enlarged counterbore 106 of dielectric insert 98. Mounting member 102 has an extending lead 108 in which is mounted a contact 110. Contact 110 may be soldered into lead 108 or may be pressure fitted therein. An active optoelectronic element 112 is physically and electrically connected, as for example by solder joints 114 to mount 102. It is also connected to body 90 by solder joint to ferrule 100. Ferrule 100 is crimped into body 90. An optical system including a lens 116 and an optically clear resilient seal 118 are positioned in a bore 120 of ferrule 100 to transmit light to or receive light from optoelectronic element 112.

For a light emitting optoelectronic element 56S, device 112 would be a light energy generating device such as an incandescent lamp or a light emitting diode. For purposes of data transmission, the turn-on/turn-off times for incandescent lamps are far too great to obtain usable repetition rates. Since switching times for light emitting diodes are in the vicinity of 1 microsecond or less, the light emitting devices will therefore be assumed to be light emitting diodes (LEDs). Of the two types of LEDs which are presently available, one type gives off visible light while the other type of LED, using gallium arsenide, emits radiation in the near infrared region at about 0.9 micrometer wavelength. The gallium arsenide LED is the more efficient of the two, having greater output for a given amount of input power. The active elements 112 for the light emitting termination elements will therefore be considered to be gallium arsenide LEDs emitting radiation in the near infrared region.

The light responsive devices utilized in termination 56R will be considered to be photoconductive devices, photovoltaic devices being unsuitable because of their large size and sluggish response. Photoconductive devices may either be silicon photodiodes or phototransistors. The photodiode is essentially the same as a conventional silicon diode except that it has an optical window which allows light to be directed into the PN junction. With the diode operating reversed biased, the dark current is generally less than 1 microampere. Light striking the junction causes a sharp increase in the leakage current. These time-varying currents may be reproduced as data. The phototransistor's function is much the same as a conventional transistor, the primary difference being that most phototransistors have no base lead. Only the emitter and collector connections are brought out of the package, circuit gain being controlled by the amount of light incident on the collector-base junction when it is exposed to an optical opening. While the response time for phototransistors is not as rapid as it is for photodiodes, phototransistors do have the advantage of being capable of amplification. Both photodiodes and phototransistors are available in suitable size to be contained within the termination elements. However, because of the more rapid response time of the photodiodes, they are the preferred element for this application.

The fiber optic bundle 16 is contained in a opaque flexible jacket 124. Over this jacket is positioned a ferrule 126 having an annular crimp groove 138 formed therein. Ferrule 126 has an extending portion 130 which covers a projecting end of fiber optic bundle 16. The projecting portion of ferrule 130 with the fiber optic bundle therein fits tightly into counterbore 120 of metallic ferrule 100 to properly align the fiber-optic bundle with respect to the lens 116 of active device 112 when the fiber optic termination is fitted into the optoelectronic termination as shown in FIG. 3. The fiber optic bundle with its mounted ferrule is moved into the optoelectronic termination assembly 56 until a shoulder 132 of ferrule 126 butts or bottoms against metallic ferrule 100. With the elements in this position, the polished end 134 of the fiber optic bundle slightly depresses resilient seal 118 and is in close proximity to lens 116. The terminated fiber optic bundle is held firmly in place in optoelectronic termination 56 by crimping body 90 at point 138 with a standard crimping tool.

While the optoelectronic termination shown in FIGS. 2 and 3 is suitable for many applications, this design does suffer from at least two limitations. First, since the fiber optic bundle is secured in the termination by crimping, it is difficult to open the termination element to, for example, remove a malfunctioning active device 112. A termination design which would permit the termination element and the fiber optic bundle to be easily separated would thus be preferable. Second, the active elements, and in particular the gallium arsenide LEDs, tend to generate a certain amount of heat which must be dissipated in order to prevent damage to the active device and other components.

FIGS. 4 and 5 illustrate two possible designs for the termination element which permit for the easy removal of the fiber optic bundle. In FIG. 4, the element body 90 is shown as extended slightly with a rear-release clip 140 being mounted in the extended portion. Ferrule 128 has a groove 142 which terminates in a shoulder 144. When the fiber optic bundle is inserted in termination 56, clip 140 rides on ferrule 128 until the bundle is in its fully inserted position at which time the clip drops down into groove 142 and butts against shoulder 144 to lock the bundle in place. A rear-release tool may be inserted between body 90 and ferrule 128 to cam clip 140 out of engagement with shoulder 144 to permit removal of the fiber optic bundle from termination 56.

FIG. 5 illustrates an alternative mechanism for locking the fiber optic bundle in the termination 56. For this embodiment, the end of counterbore 96 is shown as having an internal thread 146 which mates with an external thread 148 formed on either ferrule 128 or a locking nut mounted behind the ferrule. The ferrule or the locking nut may be rotated to secure the bundle in the termination or to remove the bundle from the termination.

FIGS. 4 and 5 also illustrate the lead wire 152 from active device 112 which is attached electrically to a conductive body 154 mounted in counterbore 96 of body 90. Body 154 is physically and electrically connected to body 90 by solder 156.

In order to improve the heat dissipating properties of the element, the shape of the mount 160 for LED 112 is modified to significantly expand the diameter and length of the lead portion. As shown in FIG. 4, the area of a cross-section of this lead portion is greater than the area of the LED clip. The material for the mount is also selected to have good heat dissipating properties. Thus, mount 160 might be fabricated of copper rather than of Kovar or of some other material having inferior heat dissipating properties.

Mount 160 is supported in the bore of a dielectric insert 162 which is substantially the same as the dielectric insert 98 of FIGS. 2 and 3 but of somewhat lesser thickness. A heat sink compound such as a silicon based dielectric material may be utilized in the gap between mount 160 and insert 162 and in the gap between insert 162 and body 90. This eliminates trapped air which could reduce the rate of heat flow.

A contact pin 164 is secured in a recess in mount 160 and electrically connected thereto by solder 166 or crimping. Multiple contact members 168 are machined as a part of body 90 and protected from damage by hood 170 which is secured thereto by crimping or other suitable means.

In order to improve the heat dissipating properties of a connector, particularly the connector 12 at the sending end of the assembly, the material for dielectric insert 52S could be of an insulating material having good heat dissipation properties such as alumina rather than a standard insulating insert material such as glass filled diallyl phthalate or epoxy. In addition, a larger type of insert which accepts socket type contacts could be utilized.

Figure 6:
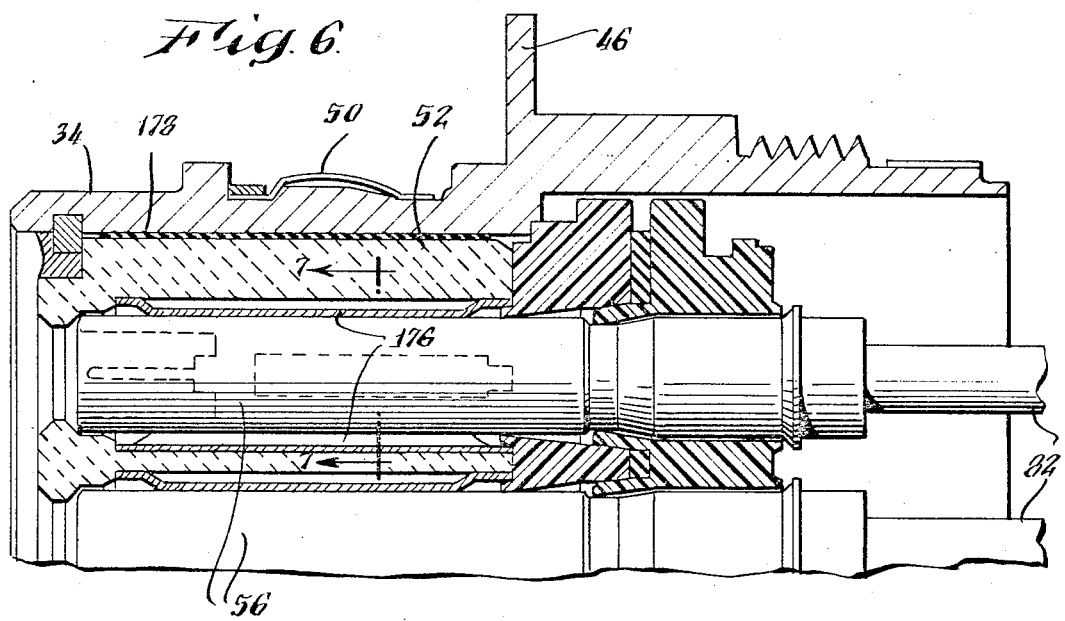
FIGS. 6 and 8 are partial sectional views for various embodiments of an optoelectronic terminating connector utilizing the termination element of, for example, FIG. 4.
Figure 7:
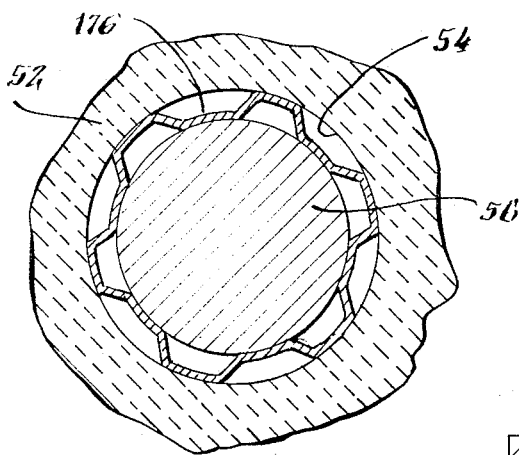
FIG. 7 is a sectional view along the line 7—7 in FIG. 6.

FIG. 6 illustrates an embodiment of the invention with further improved heat dissipating properties. For this embodiment of the invention, a metallic, corrugated heat transfer clip 176 (also see FIG. 7) is mounted in each contact pocket 54. The clip, having spring characteristics, is wedged into good physical contact both with the external surface of body 90 of the termination and with the walls of pocket 54 in which the contact is seated. This assures good heat transfer between the termination and dielectric insert 52. Without clip 176, the air trapped between the termination and the walls of the pocket would reduce the rate of heat flow between these two elements. Insert 52 could be constructed, as indicated above, of an insulating material having good heat dissipating properties such as alumina. To further improve the flow of heat from the termination to the conductor shell 34 from whence it can be dissipated to panel 66 and the external environment, the gap between the insert 52 and shell 34 is filled with heat sink compound 178. A silicon based dielectric material may, for example, be utilized as the heat sink compound.

Figure 8:
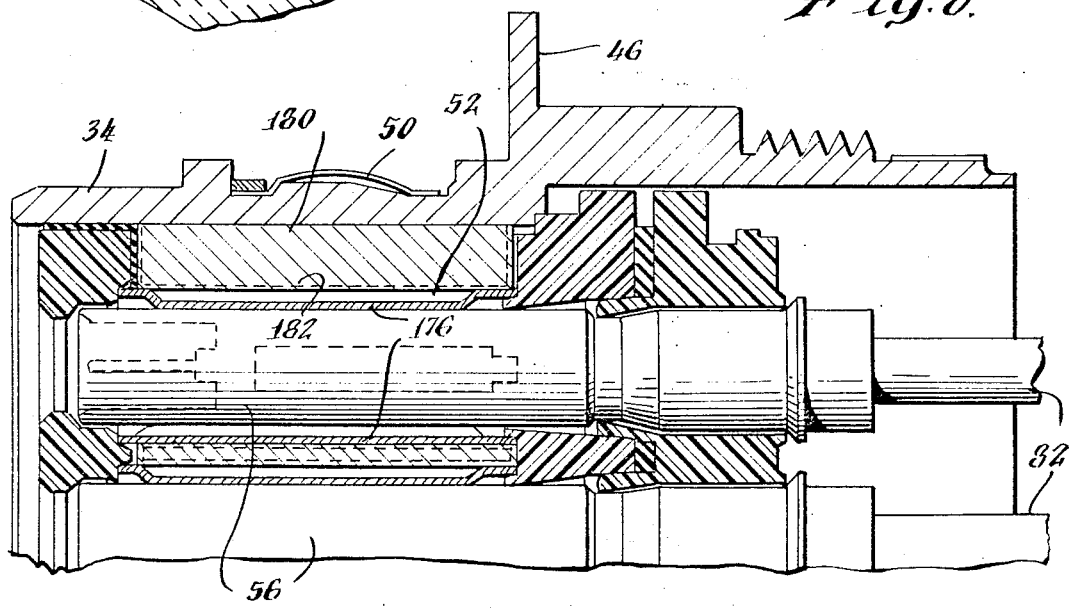

FIG. 8 illustrates still another embodiment of the invention which provides near optimum heat dissipation properties. For this embodiment of the invention an insert 180 of a metal such as aluminum is substituted for the dielectric insert 52 utilized with the embodiment of the invention shown in FIG. 6. This insert is in intimate physical contact with shell or body 34 to effect the transfer of heat thereto. In order to provide the required electrical insulation between the terminations 56 and between terminations and shell 34, the inner walls 182 of each pocket 52 are anodized to provide a teflon penetrated hard coat anodized surface for each of these walls. The anodized surface of each of these walls has a high dielectric breakdown value providing the required insulation.

While the discussion above is with reference to certain preferred embodiments, it is apparent that additional modifications might also be possible. For example, it is noted that because of the connector design, contacts 80 are longer than contacts 56. It is therefore apparent that a longer mount, and thus greater heat dissipation, would be possible if the termination including the photodiode or other active element was positioned in contact 80 rather than in contact 56. This could be accomplished by attaching plug 36 to panel 66 and having receptacle 60 as the termination element containing connector element. Further, while in the discussion so far, it has been assumed that only light emitting elements are in one of the connectors and only light receiving elements in the other connector, for some applications both sending and receiving elements might be supported in both of the connectors. Thus, where cable 10 is connecting a remote device to a central station, some of the bundles 16 could be utilized to send information from the central station to the remote station while other bundles are being utilized for sending information from the remote station to the central station.

There might also be other modifications in the details of the various components of the assembly. Thus, while the invention has been particularly shown and described above with reference to preferred embodiments thereof, the foregoing and other changes in form and details may be made therein by those skilled in the art while still remaining within the spirit and scope of the invention.

What is claimed is:

1. A termination element for a single bundle of a light conducting cable comprising:

an element body having a central bore, said bore including an enlarged forward counterbore adapted to have said cable secured therein;

an active optoelectronic device;

a solid metallic element in which said device is mounted, said element being mounted in said body bore and being adapted for dissipating heat from said device;

contact means attached at one end through said mounting means to make electrical contact with said device and projecting at the other end from said element for connection to external elements; and means mounted in front of said device for transmitting light between said device and said cable bundle.

2. An element of the type described in claim 1 wherein said device is a light emitting diode (LED).

3. An element of the type described in claim 1 wherein said metallic element has a lead formed as part thereof, said lead having a cross-section area greater than that of said LED and being of a material having high heat conductivity.

4. An element of the type described in claim 1 wherein there are a plurality of said termination elements, the light conducting cable having a bundle for each of said elements; and including a conductive connector shell having an internal bore; and means for supporting said elements in said bore, said supporting means including means for dissipating heat from said elements.

5. An element of the type described in claim 4 wherein the heat dissipating means of said supporting means includes an insert of heat dissipating material substantially filling said shell bore, said insert having openings in which said elements are supported, and a corrugated metal sleeve supporting each element in its opening, each of said sleeves being in physical contact with both the body of the element and the walls of the opening to transfer heat from the element to the insert.

6. An element of the type described in claim 5 wherein said insert is of an electrically insulating material and including a layer of heat sink compound filling the space between said insert and said shell.

7. An element of the type described in claim 5 wherein said insert is of an electrically conductive material having a dielectric anodized surface for the walls of each of said insert openings and high thermal conductivity.

8. An element of the type described in claim 1 wherein said device is a photo-detector device.

9. An element of the type described in claim 8 wherein said photo-detector device is a photo diode.

10. An element of the type described in claim 1 wherein there are a plurality of said termination elements, said cable having a bundle for each of said elements; and including a conductive connector shell having an internal bore; and means for supporting said elements in said bore.

11. An element of the type described in claim 1 wherein said light transmitting means includes a lens and a seal.

12. An element of the type described in claim 1 including a ferrule secured to said cable bundle and sized to fit in said counterbore with said bundle, the walls of said counterbore being adapted for crimping to said ferrule to secure the cable in the element.

13. An element of the type described in claim 1 wherein said counterbore is internally threaded; and including an externally threaded element mounted on said cable bundle and adapted to coact with said threaded counterbore to secure the bundle in the element.

14. An element of the type described in claim 1 wherein said counterbore has a rear-release clip mounted therein; and wherein said ferrule includes means coacting with said clip to secure said cable bundle in the element.

15. An optoelectronic cable assembly comprising:

a light conducting cable having one or more light conducting bundles;

a first connector element having a first connector body, a light emitting device for each of said bundles, means for mounting said light emitting devices in said first connector body, said means including means for dissipating heat from said devices, and contact means connected at one end to said light emitting devices and adapted at the other end for connection to the contacts of a mating connector element;

a second connector element having a second connector body, a light detecting device for each of said bundles, means for mounting said light detecting devices in said second connector body, and contact means connected at one end to said light detecting devices and adapted at the other end for connection to a mating connector element; and means for attaching the ends of each of said cables to said first and to said second connector connector elements respectively, said means including a separate focusing means for directing light from each light emitting device into the corresponding cable bundle and a separate means for directing light from each cable to the corresponding light detecting device.

* * * * *

UNITED STATES PATENT OFFICE
CERTIFICATE OF CORRECTION

Patent No. 3,790,791     Dated February 5, 1974

Inventor(s) Norman Richard Anderson

It is certified that error appears in the above-identified patent and that said Letters Patent are hereby corrected as shown below:

Column 8, line 10, "mounting means" should read

-- metallic element --.

Column 10, line 13, "connector" first occurrence should be deleted.

Signed and Sealed this twentieth Day of April 1976

[SEAL]

Attest:

RUTH C. MASON
Attesting Officer

C. MARSHALL DANN
Commissioner of Patents and Trademarks